United States Patent
Jung

(10) Patent No.: US 11,498,415 B2
(45) Date of Patent: Nov. 15, 2022

(54) FUEL SUPPLY VALVE

(71) Applicants: Hyundai Motor Company, Seoul (KR); Kia Motors Corporation, Seoul (KR)

(72) Inventor: Se Kwon Jung, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 55 days.

(21) Appl. No.: 16/658,332

(22) Filed: Oct. 21, 2019

(65) Prior Publication Data

US 2020/0406744 A1 Dec. 31, 2020

(30) Foreign Application Priority Data

Jun. 25, 2019 (KR) .................. 10-2019-0075626

(51) Int. Cl.
*F16K 31/06* (2006.01)
*B60K 15/03* (2006.01)
*F17C 13/04* (2006.01)
*F16K 1/52* (2006.01)
*B01D 35/02* (2006.01)

(52) U.S. Cl.
CPC ........ *B60K 15/03006* (2013.01); *B01D 35/02* (2013.01); *F16K 1/523* (2013.01); *F16K 31/0655* (2013.01); *F17C 13/04* (2013.01); *B60K 2015/03026* (2013.01); *B60K 2015/03296* (2013.01); *B60K 2015/03302* (2013.01); *B60K 2015/03315* (2013.01); *F17C 2205/0326* (2013.01); *F17C 2205/0338* (2013.01); *F17C 2221/012* (2013.01); *F17C 2265/066* (2013.01); *F17C 2270/0184* (2013.01); *Y10T 137/794* (2015.04); *Y10T 137/8122* (2015.04)

(58) Field of Classification Search
CPC ............ F16K 31/0655; F16K 31/0675; F16K 31/0693; Y10T 137/794; Y10T 137/8122; B60K 2015/03026; B60K 2015/03296; B60K 2015/03302; F17C 2223/036; F17C 2205/0338; F17C 2205/0326; F17C 2270/0184; B01D 35/02
See application file for complete search history.

(56) References Cited

U.S. PATENT DOCUMENTS 3,606,241 A * 9/1971 Bornholdt ............... H01F 7/088
251/52
4,821,774 A * 4/1989 Chorkey ............. F16K 31/0693
137/625.26

(Continued)

FOREIGN PATENT DOCUMENTS

JP 2002276840 A 9/2002
JP 2003156268 A 5/2003
(Continued)

*Primary Examiner* — Matthew W Jellett
(74) *Attorney, Agent, or Firm* — Fox Rothschild LLP

(57) ABSTRACT

A fuel supply valve for supplying fuel from a fuel tank to a fuel cell stack includes: a plunger having a hollow therein, a core part disposed on the plunger, and a block part disposed within the hollow to maintain airtightness between the core part and the plunger, and a space in which the airtightness of the hollow has been maintained by the plunger, the core part, and the block part is defined as a pressure chamber.

11 Claims, 7 Drawing Sheets

(56) References Cited

U.S. PATENT DOCUMENTS

| | | | | |
|---|---|---|---|---|
| 4,852,853 | A | * | 8/1989 | Toshio ............... F16K 31/0693 251/129.07 |
| 5,114,116 | A | * | 5/1992 | Muller ................... B60T 8/363 251/129.07 |
| 5,516,424 | A | * | 5/1996 | Strohschein .......... B01D 29/23 210/232 |
| 6,082,705 | A | * | 7/2000 | Arvidsson ........... A61M 16/204 251/129.07 |
| 7,762,278 | B2 | * | 7/2010 | Adams ................... F16L 37/32 137/614.04 |
| 8,348,231 | B2 | * | 1/2013 | Czimmek ........... F16K 31/0693 251/129.07 |
| 8,371,330 | B2 | * | 2/2013 | Kuroyanagi ............ F16K 1/308 137/512.3 |
| 2005/0184843 | A1 | * | 8/2005 | Huerta ............... F16K 31/0658 335/256 |
| 2007/0228311 | A1 | * | 10/2007 | Beneker .............. F16K 31/0665 251/129.07 |
| 2015/0090912 | A1 | * | 4/2015 | Buse ........................ F16K 1/42 251/129.07 |
| 2015/0267836 | A1 | * | 9/2015 | Lee .................... F16K 31/0658 251/129.07 |

FOREIGN PATENT DOCUMENTS

| | | | |
|---|---|---|---|
| JP | 2004116684 | A | 4/2004 |
| KR | 101076231 | B1 | 10/2011 |
| KR | 20180000059 | A | 1/2018 |
| KR | 20180045348 | A | 5/2018 |

\* cited by examiner

FUEL SUPPLY VALVE

CROSS-REFERENCE TO RELATED APPLICATION

This application claims under 35 U.S.C. § 119(a) the benefit of Korean Patent Application No. 10-2019-0075626 filed on Jun. 25, 2019, the entire contents of which are incorporated herein by reference.

BACKGROUND

(a) Technical Field

The present disclosure relates to a fuel supply valve in which a pressure chamber is defined within a plunger.

(b) Description of the Related Art

Generally, a fuel cell system is configured to include a fuel cell stack for generating electrical energy, a fuel supply system for supplying fuel (hydrogen) to the fuel cell stack, an air supply system for supplying oxygen in the air, which is an oxidant necessary for an electrochemical reaction, to the fuel cell stack, a heat and water management system for controlling an operation temperature of the fuel cell stack, etc.

In the fuel supply system, that is, a hydrogen tank of the hydrogen supply system, high-pressure compressed hydrogen of about 700 bar is stored, and the stored compressed hydrogen is discharged to a high-pressure line according to on/off of a high-pressure regulator mounted on a hydrogen tank inlet, and then depressurized through a starter valve and a hydrogen supply valve to be supplied to the fuel cell stack.

That is, in the related art, hydrogen in the high-pressure hydrogen tank of about 700 bar is primarily depressurized by the high-pressure regulator, the hydrogen is secondarily depressurized through the hydrogen supply valve or an injector, and then the hydrogen is supplied to the fuel cell stack. When the secondary depressurization is performed by using the hydrogen supply valve in the fuel cell system, hydrogen air-tightness is secured through the starter valve and at the same time, the hydrogen flow rate is precisely controlled through the hydrogen supply valve.

However, there is a disadvantage in that when acrosssectional area of a pressure chamber through which the hydrogen gas flows is excessively wider than an entire cross-sectional area of the hydrogen supply valve, overshoot may occur at an initial opening of the valve.

The above information disclosed in this Background section is only for enhancement of understanding of the background of the disclosure and therefore it may contain information that does not form the prior art that is already known in this country to a person of ordinary skill in the art.

SUMMARY

An object of the present disclosure is to provide a proportional control valve type fuel supply valve, which may easily maintain airtightness even at high-pressure and substantially prevent overshoot from occurring upon opening of a valve, and regulate its opening according to an input current.

Another object of the present disclosure is to provide a fuel supply valve in which a pressure chamber is defined within a plunger.

A fuel supply valve for supplying fuel to a fuel cell stack from a fuel tank includes: a plunger having a hollow therein in a normal closed form as a proportional control valve in which opening of the valve is regulated according to an amount of input current, a core part disposed on the plunger, and a block part disposed within the hollow to maintain airtightness between the core part and the plunger, and a space in which the airtightness of the hollow has been maintained by the plunger, the core part, and the block part is defined as a pressure chamber.

According to an embodiment, the core part has an extension part inserted into the hollow of the plunger, the block part is disposed between the extension part and the plunger, and the extension part transfers a magnetic force to the plunger.

According to an embodiment, the extension part has a columnar shape having a curved outer surface, and the block part is disposed in a recess of the extension part to maintain the airtightness between the extension part and the plunger.

According to an embodiment, the fuel supply valve further includes a chamber guide inserted into the hollow of the plunger and connected with the core part, and the block part is disposed between the chamber guide and the plunger.

According to an embodiment, the fuel supply valve further includes a spring disposed within the pressure chamber to connect the plunger with the chamber guide.

According to an embodiment, the pressure chamber is connected with an internal flow path penetrating an airtightness member disposed on the lower portion of the plunger, and the internal flow path is opened by the lifting the plunger to discharge the gas within the pressure chamber.

According to an embodiment, the fuel supply valve further includes a valve body disposed on the lower portion of the airtightness member, and the valve body includes a seat part contacting the airtightness member by movement of the plunger, and the seat part blocks the gas within the pressure chamber from being discharged by contacting the airtightness member.

According to an embodiment, the seat part includes an internal space through which gas flows, and the length of the internal space is equal to the length of the pressure chamber in the direction perpendicular to the direction from the seat part toward the pressure chamber.

According to an embodiment, the cross-sectional area opened by the internal space is equal to the cross-sectional area of the pressure chamber.

According to an embodiment, the seat part includes an internal space through which gas flows and further includes an intermediate flow path for connecting the internal space with a fuel inlet for supplying fuel from the fuel tank, and the diameter of the intermediate flow path is equal to the diameter of the pressure chamber.

According to an embodiment, the plunger is moved in a first direction flowing from the seat part toward the pressure chamber to open the internal flow path, and when the internal flow path is opened, a force applied to the plunger in the first direction by the gas in-flowed through the intermediate flow path is canceled by a force applied to the plunger in a second direction that is the direction opposite to the first direction through the gas flowing within the pressure chamber.

According to an embodiment, the fuel supply valve further includes an airtightness member fixing part disposed to be symmetrical with respect to the internal flow path, and the opened region provided to the airtightness member fixing part has a larger cross-sectional area in the horizontal direction than that of the pressure chamber so that the internal flow path is disposed.

According to an embodiment, the fuel supply valve further includes a porous member disposed within the pressure chamber, and the porous member is disposed on the lower portion of the pressure chamber adjacent to the internal flow path.

According to an embodiment of the present disclosure, it is possible to maintain the force of the spring necessary for maintaining airtightness small when the force at which the pressure of the gas applied to the valve inlet end lifts the plunger and the force at which the internal pressure of the pressure chamber presses the plunger are canceled each other and no current is applied to the valve solenoid to reduce the magnetic force necessary for overcoming the force of the spring and lift the plunger, thereby maintaining airtightness performance at high-pressures even while reducing the size of the coil. In addition, as a portion of the core part is inserted into the hollow formed within the plunger, the effect that the magnetic force is transferred from the core part to the plunger may be increased. Therefore, it is possible to apply the relatively small-sized coil to the valve, thereby implementing miniaturization of the fuel supply valve.

According to an embodiment of the present disclosure, it is possible to maintain the airtightness between the extension part disposed within the plunger and the plunger, thereby defining the pressure chamber. Therefore, it is possible to easily maintain the airtightness between the extension part and the plunger.

According to an embodiment of the present disclosure, it is possible to minimize the length of the internal flow path for connecting the pressure chamber and the seat part, thereby enhancing the processability of the plunger and the airtightness member.

According to an embodiment of the present disclosure, the plunger moves according to the correlation of the force generated by the spring and the magnetic force regardless of the pressure that may be generated in the gas. Therefore, the relationship of the force acting on the fuel supply valve before or after the fuel supply valve is opened is the same. In addition, it is possible to minimize the volume of the pressure chamber, thereby minimizing the overshoot that may occur due to the change in the equilibrium relationship between the pressures at opening of the fuel supply valve and the sudden flow of the internal gas.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given herein below by way of illustration only, and thus are not limitative of the present disclosure, and wherein.

Figure 1:
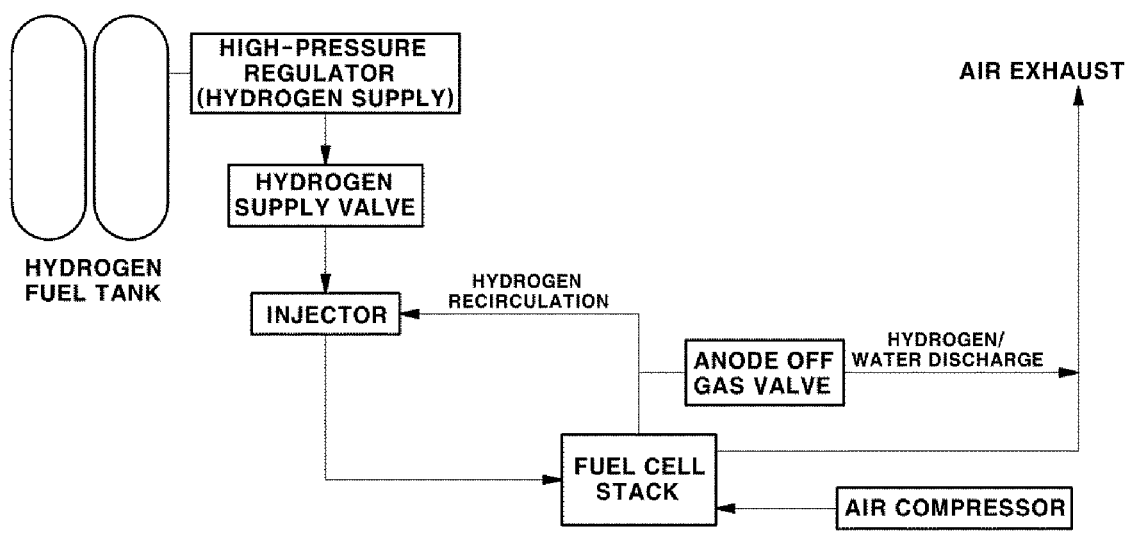
FIG. 1 is a diagram showing a configuration of a fuel cell system according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the drawings, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The advantages and features of the present disclosure, and a method for achieving them will become apparent with reference to the embodiments described in detail below together with the accompanying drawings. The present disclosure can, however, be embodied in many different forms and should not be construed as being limited to the embodiments set forth herein, and rather, these embodiments are provided so that this disclosure will be thorough and complete, and will fully convey the scope of the disclosure to those skilled in the art to which the present disclosure pertains, and the present disclosure is only defined by the scope of the claims. The same reference numerals refer to the same elements throughout the specification.

In addition, in the present specification, classifying the names of components into the first, second, etc. is for distinguishing the names of the components from each other in the same relation, and is not necessarily limited to its order in the following description.

The detailed description is illustrative of the present disclosure. In addition, the foregoing is intended to illustrate and explain the preferred embodiments of the present disclosure, and the present disclosure may be used in various other combinations, modifications, and environments. That is, it is possible to change or modify within the scope of the concept of the disclosure described in the present specification, the scope equivalent to the disclosure, and/or the scope of the skill and knowledge of the art. The described embodiments are intended to illustrate the best mode for implementing the technical spirit of the present disclosure, and various changes may also be made in the specific applications and uses of the present disclosure. Therefore, the detailed description of the above-described disclosure is not intended to limit the present disclosure to the disclosed embodiments. In addition, it should be construed that the appended claims are also intended to cover such other embodiments.

FIG. 1 is a diagram showing a configuration of a fuel cell system according to an embodiment of the present disclosure.

Referring to FIG. 1, a high-pressure fuel tank maybe present in a fuel supply apparatus of a fuel cell system. The high-pressure fuel tank preferably uses hydrogen as fuel and high-pressure hydrogen of about 700 bar to 875 bar at maximum is stored in the tank as fuel. Since the high-pressure fuel cannot be supplied directly to a fuel cell stack, it is decompressed through a high-pressure regulator and a valve, and then supplied to the fuel cell stack. It may be primarily depressurized by the high-pressure regulator preferably to a pressure of 30 bar or less. The decompressed fuel may be secondarily depressurized by using a valve or an injector. It may be depressurized preferably to a pressure of 4 bar or less. If the valve rather than the injector is used for the secondary decompression, the valve should have fuel airtightness against a pressure of about 20 bar and in addition, a precise control of the fuel flow rate in the valve is required. The fuel cell system according to an embodiment of the present disclosure may secure the fuel airtightness and implement the precise control of the fuel flow rate by using only single fuel supply valve.

Figure 2:
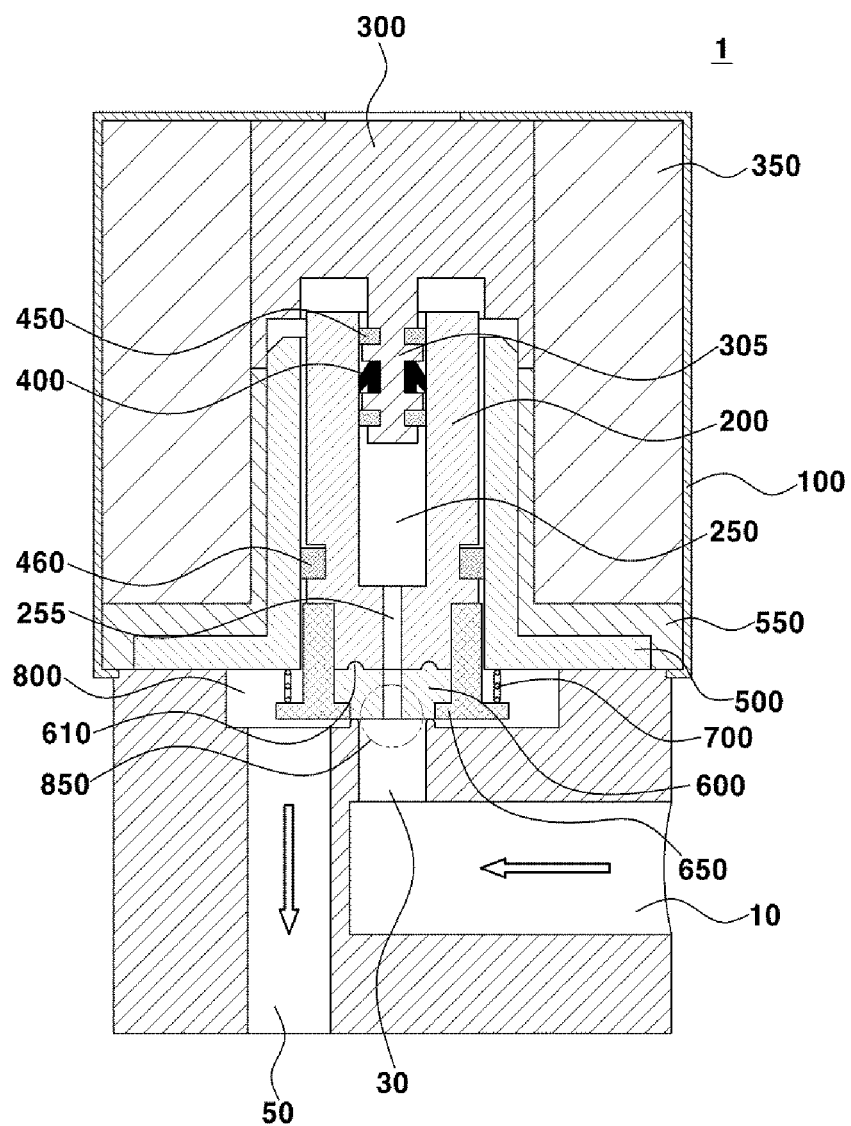
FIG. 2 is a cross-sectional diagram showing a state where a fuel supply valve has been closed according to an embodiment of the present disclosure.

FIG. 2 is a cross-sectional diagram showing a state where the fuel supply valve has been closed according to an embodiment of the present disclosure.

Referring to FIG. 2, a fuel supply valve 1 may include a housing 100, a plunger 200, a core part 300, a block part 400, a yoke 500, an airtightness member 600, a spring 700, and a valve body 800. The plunger 200, the core part 300, the block part 400, and the yoke 500 maybe disposed within the housing 100.

The plunger 200 maybe a configuration that may move in the vertical direction within the housing 100. The flow of fuel (e.g., hydrogen gas) flowing from a fuel tank to a fuel cell stack may be controlled by the movement of the plunger 200. The plunger 200 may have a hollow therein. The hollow may maintain airtightness by the plunger 200 and the core part 300 described later, and the space in which the airtightness has been maintained may be defined as a pressure chamber 250. The plunger 200 may be made of a magnetic material.

The pressure chamber 250 maybe connected with an internal flow path 255 to be communicated with a fuel inlet 10 for supplying fuel from the fuel tank and a fuel outlet 50 for supplying fuel to the fuel cell stack. The internal flow path 255 maybe connected with an intermediate flow path 30 connected with the fuel inlet 10.

The core part 300 may be disposed on the plunger 200 to contact the plunger 200. The core part 300 maybe made of a magnetic material. The coil 350 maybe wound around the core part 300. When electricity is applied to the coil 350 in order to open the fuel supply valve 1, the core part 300 and the plunger 200 may be magnetized by the magnetic force generated from the coil 350, and the magnetized core part 300 may pull the plunger 200. That is, the plunger 200 may be lifted in the vertical direction by the magnetic force to open the fuel supply valve 1.

The core part 300 may include an extension part 305 inserted into the hollow of the plunger 200. The extension part 305 may have a columnar shape having a curved outer surface. For example, the outer surface of the extension part 305 may have a shape having a recess continuously disposed thereon. The extension part 305 may be inserted into the hollow to increase the effect in which the magnetic force is transferred to the plunger 200. That is, the case where the extension part 305 is inserted into the plunger 200 may have the efficiency of transferring the magnetic force better than the case where the core part 300 is disposed on the plunger 200 and the plunger 200 and the core part 300 are in surface contact therebetween. In addition, since the magnetic force may be efficiently transferred by the extension part 305 with the smaller coil 350, the size of the fuel supply valve 1 may be reduced.

The block part 400 may be disposed between the plunger 200 and the core part 300 to maintain the airtightness of the hollow of the plunger 200. For example, the block part 400 may include an O-ring and a rubber gasket. The block part 400 may have a wedge shape. Specifically, the block part 400 may be disposed between the extension part 305 and the plunger 200. In addition, the block part 400 may be disposed in the recess formed in the extension part 305. The core part 300 and the block part 400 may form the pressure chamber 250 by maintaining the airtightness of the hollow of the plunger 200.

A first guide ring 450 may be disposed between the plunger 200 and the core part 300. The first guide ring 450 may guide the path through which the lubricant applied flows in order to minimize friction between the plunger 200 and the extension part 305.

A second guide ring 460 may be disposed between the plunger 200 and the yoke 500 surrounding the plunger 200. That is, the yoke 500 has a structure having a hollow therein, and the plunger 200 may be inserted into the hollow of the yoke 500. That is, the plunger 200 may move within the yoke 500. The yoke 500 may be made of a magnetic material. The second guide ring 460 may prevent the plunger 200 from being excessively inclined in the horizontal direction when the plunger 200 is lifted or lowered. The block part 400 may be expanded or contracted evenly in the radial direction by the second guide ring 460.

A core guide 550 surrounding the yoke 500 may be disposed on the outer surface of the yoke 500. The core guide 550 may be disposed between the yoke 500 and the coil 350. The core guide 550 may be made of a non-magnetic material. The core part 300 may be disposed on the core guide 500.

The airtightness member 600 may be disposed on the lower portion of the housing 100. The airtightness member 600 may be a configuration of contacting the lower portion of the plunger 200. The airtightness member 600 may contact a seat part 850, which is a configuration of the valve body 800 described later. The internal flow path 255 may be connected with the intermediate flow path 30 by penetrating the airtightness member 600. The airtightness member 600 may be in close contact with the plunger 200. Particularly, the airtightness member 600 may contact the seat part 850 by lifting or lowering the plunger 200 to open or close the internal flow path 255. A protrusion 610 may be formed at one point of the surface where the plunger 200 and the airtightness member 600 contact each other. The cross-sectional shape of the protrusion 610 may be formed to have a polygonal shape such as a circular shape or a triangular shape. The protrusion 610 may allow the plunger 200 and the airtightness member 600 to be easily engaged with each other, thereby preventing the fuel from being leaked through the interface between the plunger 200 and the airtightness member 600.

An airtightness member fixing part 650 for surrounding the outer surface of the region where the plunger 200 and the airtightness member 600 contact each other may be provided. The airtightness member fixing part 650 may protect the plunger 200 structurally by surrounding the side surface of the plunger 200, the outside of the airtightness member 600, and the lower end of the plunger 200. However, in this case, since the airtightness member fixing part 650 should not close the point where the internal flow path 255 is disposed, the airtightness member fixing part 650 may be formed to have an L shape symmetrical with respect to the internal flow path 255. The airtightness member fixing part 650 may serve to primarily absorb the impact that may be caused by the lifting or the lowering of the plunger 200.

The spring 700 may connect the yoke 500 with the airtightness member fixing part 650. The spring 700 may serve to pull the airtightness member fixing part 650 connected with the plunger 200 in the vertical direction. That is, when the plunger 200 is lifted, the spring 700 may apply a force in the direction opposite to the direction in which the plunger 200 is lifted.

The valve body 800 may be disposed on the lower portion of the housing 100. The airtightness member fixing part 650 may be disposed on the valve body 800. The seat part 850, which is a configuration of the valve body 800, may have a shape penetrated by the internal flow path 255. The seat part 850 may include an internal space through which the gas flows. The seat part 850 may contact the airtightness member 600 by the lowering of the plunger 200 to close the internal flow path 255. On the contrary, the seat part 850 may be separated from the airtightness member 600 by the lifting of the plunger 200 to open the internal flow path 255.

According to an embodiment of the present disclosure, the extension part 305 may be inserted into the plunger 200 to increase the effect of transferring the magnetic force. The extension part 305 increases the efficiency of the magnetic force compared to the valve that has adopted a structure in which the plunger 200 and the core part 300 are merely in surface contact therebetween so that the plunger 200 may smoothly move in the vertical direction even with the smaller coil 350. Therefore, it is possible to implement the miniaturization of the fuel supply valve 1.

According to an embodiment of the present disclosure, the block part 400 may be disposed within the plunger 200 to maintain the airtightness between the plunger 200 and the extension part 305. The block part 400 may easily maintain the airtightness between the plunger 200 and the extension part 305 when comparing the valve that has adopted the structure in which the plunger 200 and the core part 300 are in surface contact therebetween.

According to an embodiment of the present disclosure, it is possible to minimize the length of the internal flow path 255 for connecting the pressure chamber 250 and the seat part 850, thereby enhancing the processability of the plunger 200 and the airtightness member 600. The diameter of the pressure chamber 250 may be relatively larger than the diameter of the internal flow path 255, thereby easily processing the plunger 200. In addition, it is possible to minimize the diameter of the internal flow path 255 to increase the thicknesses of the plunger 200 and the airtightness member 600, thereby enhancing the structural robustness of the fuel supply valve 1.

Figure 3:
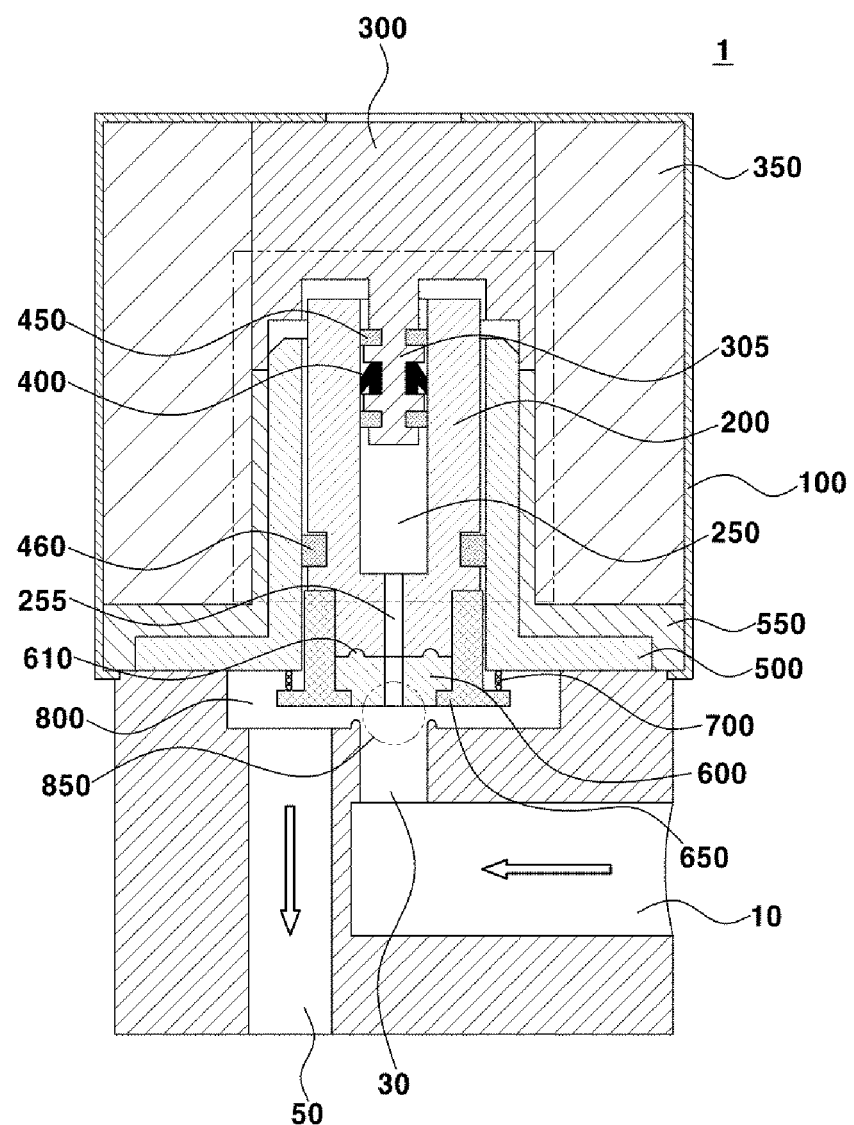
FIG. 3 is a cross-sectional diagram showing a state where a fuel supply valve has been opened according to an embodiment of the present disclosure.

FIG. 3 is a cross-sectional diagram showing a state where the fuel supply valve has been opened according to an embodiment of the present disclosure. For the sake of simplicity of description, a description duplicate to that of FIG. 2 will be omitted.

Referring to FIG. 3, when electricity is applied to the coil 350, the core part 300 and the plunger 200 are magnetized by the magnetic force generated from the coil 350 and the magnetized core part 300 lifts the plunger 200. When the force at which the magnetic force pulls the plunger 200 is larger than the sum of the force at which the gas within the pressure chamber 250 presses the plunger 200 and the force of the spring 700, the plunger 200 may be lifted to open the fuel supply valve 1. When the fuel supply valve 1 is opened, the internal flow path 255 and the seat part 850 may be separated from each other. Therefore, the gas within the pressure chamber 250 may flow to the fuel outlet 50 through the internal flow path 255 through the space below the seat part 850.

Figure 4:
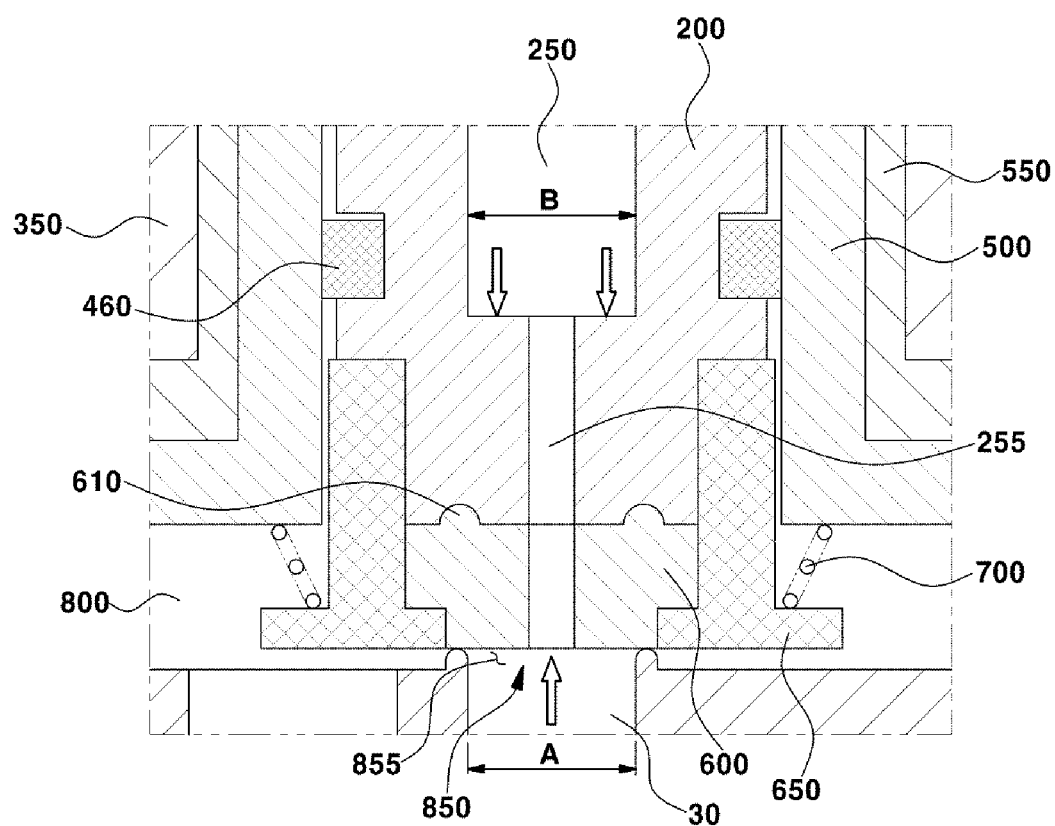
FIG. 4 is a diagram for explaining a seat part of FIG. 2.

FIG. 4 is a diagram for explaining the seat part of FIG. 2.

Referring to FIGS. 2 and 4, the seat part 850 may mean the region opened through the airtightness member fixing part 650. The seat part 850 may include an internal space 855 through which the gas flows. The internal flow path 255 may be communicated with the intermediate flow path 30 through the internal space 855. That is, the intermediate flow path 30 may connect the internal space 855 with the fuel inlet 10. The length of the seat part 850 may be equal to or smaller than the length of the pressure chamber 250 in the direction perpendicular to the direction from the seat part 850 toward the pressure chamber 250. Specifically, the area of the region opened by the internal space 855 with respect to the horizontal direction may be equal to or smaller than the area opened by the pressure chamber 250. The area opened by the pressure chamber 250 may be expressed by the cross-sectional area of the pressure chamber 250. At this time, since the pressure chamber 250 is formed within the plunger 200, the cross-sectional area of the pressure chamber 250 may be maintained equal to the internal space 855 even if the size of the plunger 200 is increased. In addition, the diameter of the intermediate flow path 30 may be equal to the diameter of the pressure chamber 250. This may mean that the internal space 855 and the intermediate flow path 30 have the same diameter.

For example, when the plunger 200 is lifted in a first direction from the seat part 850 toward the pressure chamber 250, the internal flow path 255 may be opened. That is, the fuel supply valve may be opened as the plunger 200 is lifted. When the internal flow path 255 is opened, a first force applied to the plunger 200 in the first direction by the gas in-flowed through the intermediate flow path 30 may be substantially equal to or similar to a second force applied to the plunger 200 in a second direction that is a direction opposite to the first direction through the gas flowing within the pressure chamber 250. That is, the first force may be canceled by the second force.

In addition, the airtightness member fixing part 650 disposed symmetrically with respect to the internal flow path 255 may be partially opened so that the internal flow path 255 is disposed. The internal flow path 255 and the compressed airtightness member 600 may be disposed in the region opened by the airtightness member fixing part 650. At this time, the opened region provided to the airtightness member fixing part 650 may have a larger cross-sectional area in the horizontal direction than that of the pressure chamber 250.

The fuel supply valve 1 according to an embodiment of the present disclosure may improve a problem that the force at which the pressure chamber 250 presses the plunger 200 becomes excessive due to a difference of the area between the pressure chamber 250 and the seat part 850 when the high-pressure fuel is supplied from the fuel tank. In the state where the fuel supply valve 1 has been closed, the plunger 200 and the airtightness member 600 may press the seat part 850 by the sum of a force $F_B$ of pressing the plunger 200 generated by the pressure applied to the cross section B ($F_B = P_B * A_B$, the $P_B$ refers to a pressure applied to the cross section B, the $A_B$ refers to the area of the cross section B), a force $F_S$ at which the spring 700 pulls the plunger 200, and a force $F_A$ of lifting the plunger 200 generated by the pressure applied to the cross section A ($F_A = P_A * A_A$, the $P_A$ refers to a pressure applied to the cross section A, the $A_A$ refers to the area of the cross section A). As a result, the airtightness member 600 may be deformed and in surface contact with the seat part 850, thereby maintaining the airtightness. Since the pressure chamber 250 is formed within the plunger 200, the cross-sectional area of the pressure chamber 200 may be formed to be similar to or the same as the cross-sectional area of the seat part 850 (or the opened area of the internal space 855) even if the size of the plunger 200 increases.

When electricity is applied to the coil 350 in order to open the fuel supply valve 1, the core part 300 and the plunger 200 are magnetized by the magnetic force generated from the coil 350 and the magnetized core part 300 lifts the plunger 200. When the force at which the magnetic force pulls the plunger 200 is larger than the sum of the force ($F_B$) at which the pressure ($P_B$) generated by the gas presses the plunger 200 and the force ($F_S$) by the spring 700, the plunger 200 is lifted to open the fuel supply valve 1. At this time, the gas within the pressure chamber 250 flows to the outside of the pressure chamber 250 through the plunger 200 and the internal flow path 255, and at this time, the plunger 200 is moved by the sum of the force of the spring 700 and the magnetic force. Since the cross-sectional area of the pressure chamber 250 is similar to the cross-sectional area of the seat part 850, $F_B$ is equal to or similar to $F_A$, and $F_B$ and $F_A$ cancel each other so that the plunger 200 moves according to the correlation between the force ($F_S$) generated by the spring 700 and the magnetic force regardless of the pressure that may be generated in the gas. Therefore, the relationship of the force acting on the fuel supply valve 1 before the fuel supply valve 1 is opened or after the fuel supply valve 1 has been opened may be the same, thereby minimizing the overshoot that may occur at opening of the fuel supply valve 1.

Figure 5:
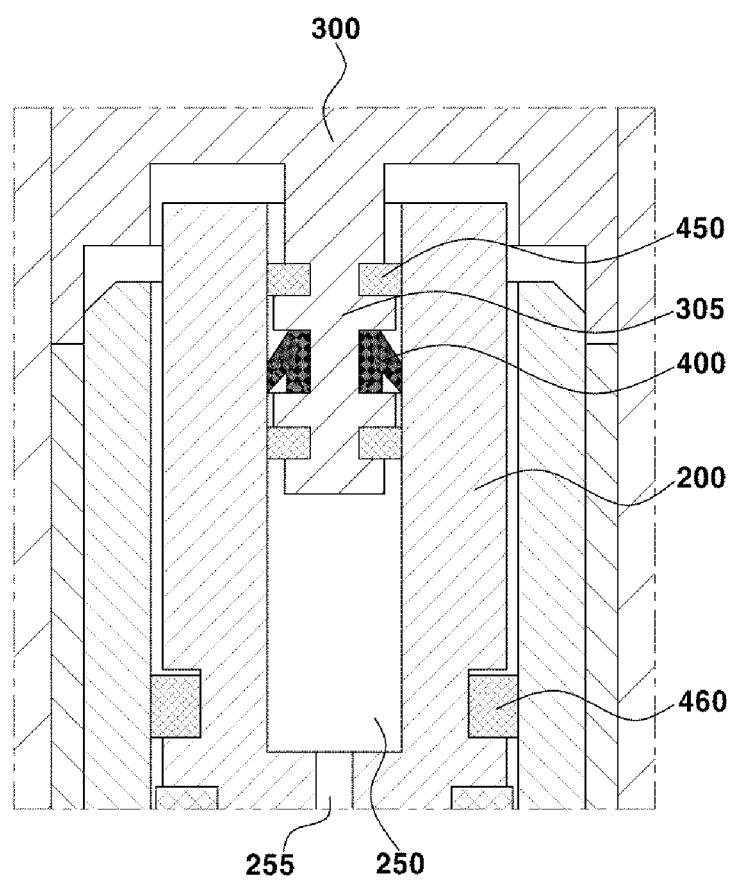
FIG. 5 is a diagram showing a block part according to an embodiment of the present disclosure.

FIG. 5 is a diagram showing a block part according to an embodiment of the present disclosure.

Referring to FIG. 5, the block part 400 may be disposed between the plunger 200 and the extension part 305, which is a configuration of the core part 300. When the high-pressure fuel is supplied from the fuel tank, the pressure of the supplied fuel is applied to the pressure chamber 250, and the pressure of the fuel applied to the inside of the pressure chamber 250 may act on the block part 400. When the pressure is applied in the direction in which the plunger 200 is lifted, the block part 400 may be expanded in the horizontal direction. As a result, the frictional force between the core part 300 and the plunger 200 may be increased by the expanded block part 400, thereby substantially limiting the movement of the plunger 200. That is, it is possible to maintain the airtightness between the core part 300 and the plunger 200 by the block part 400.

Figure 6:
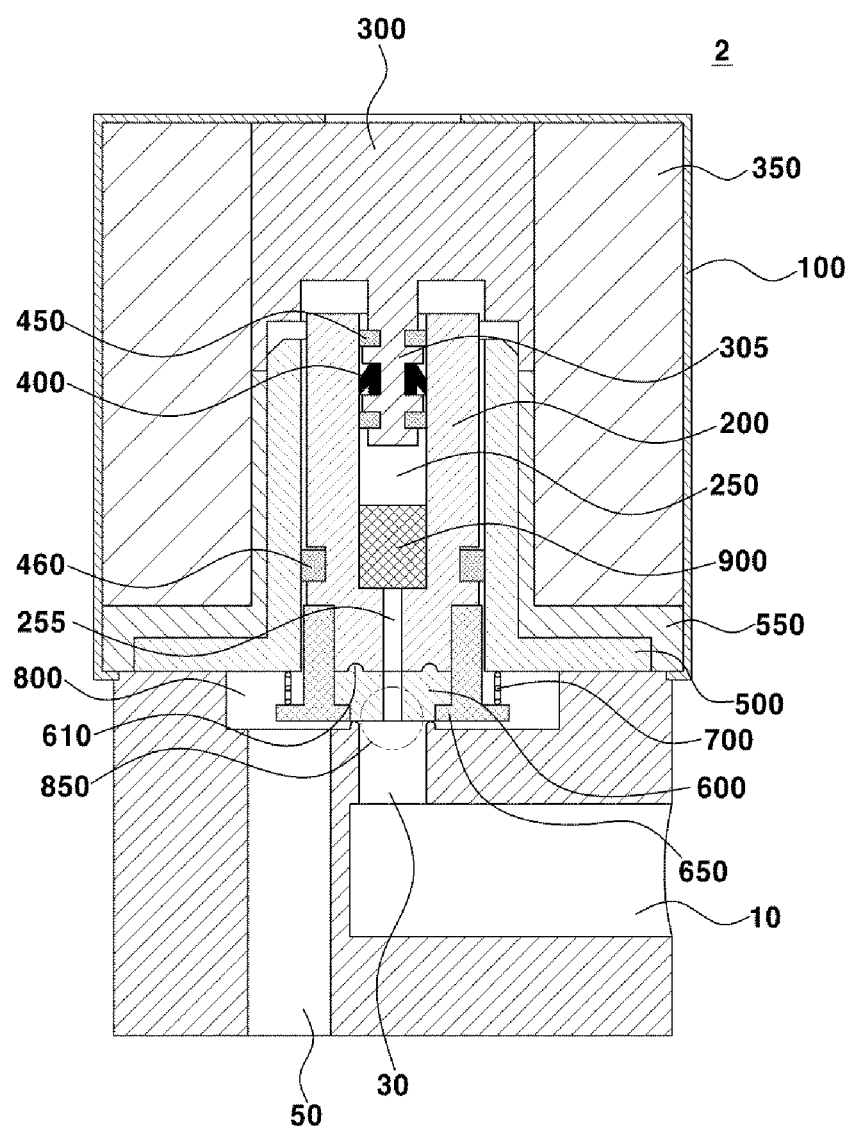
FIG. 6 is a diagram showing a fuel supply valve according to another embodiment of the present disclosure.

FIG. 6 is a diagram showing a fuel supply valve according to another embodiment of the present disclosure. For the sake of simplicity of description, a description duplicate to that of FIG. 2 will be omitted.

Referring to FIG. 6, a porous member 900 may be provided within the pressure chamber 250. The porous member 900 may be any one of a sponge, a sintered filter, etc. The porous member 900 may reduce the internal volume of the pressure chamber 250 to reduce the amount of gas flowing within the pressure chamber 250 at opening of a fuel supply valve 2, thereby reducing overshoot. In addition, the porous member 900 may prevent the lubricant (grease) applied to the block part 400 from flowing into the internal flow path 255 when being released. Specifically, the lubricant may move according to the flow of the gas, and may be primarily trapped by the first guide ring 450. The lubricant moved to the lower portion of the pressure chamber 250 does not pass through the internal flow path 255 for connecting the pressure chamber 250 with the seat part 850 and may be trapped on the wall surface of the pressure chamber 250. The fuel supply valve 2 according to an embodiment of the present disclosure may include the porous member 900 disposed on the lower portion of the pressure chamber 250 adjacent to the internal flow path 255 to trap foreign matter moved to the lower portion of the pressure chamber 250. Therefore, the foreign matter cannot flow into the internal flow path 255, and the cleanliness of the gas flowing into the fuel cell stack may be secured.

Figure 7:
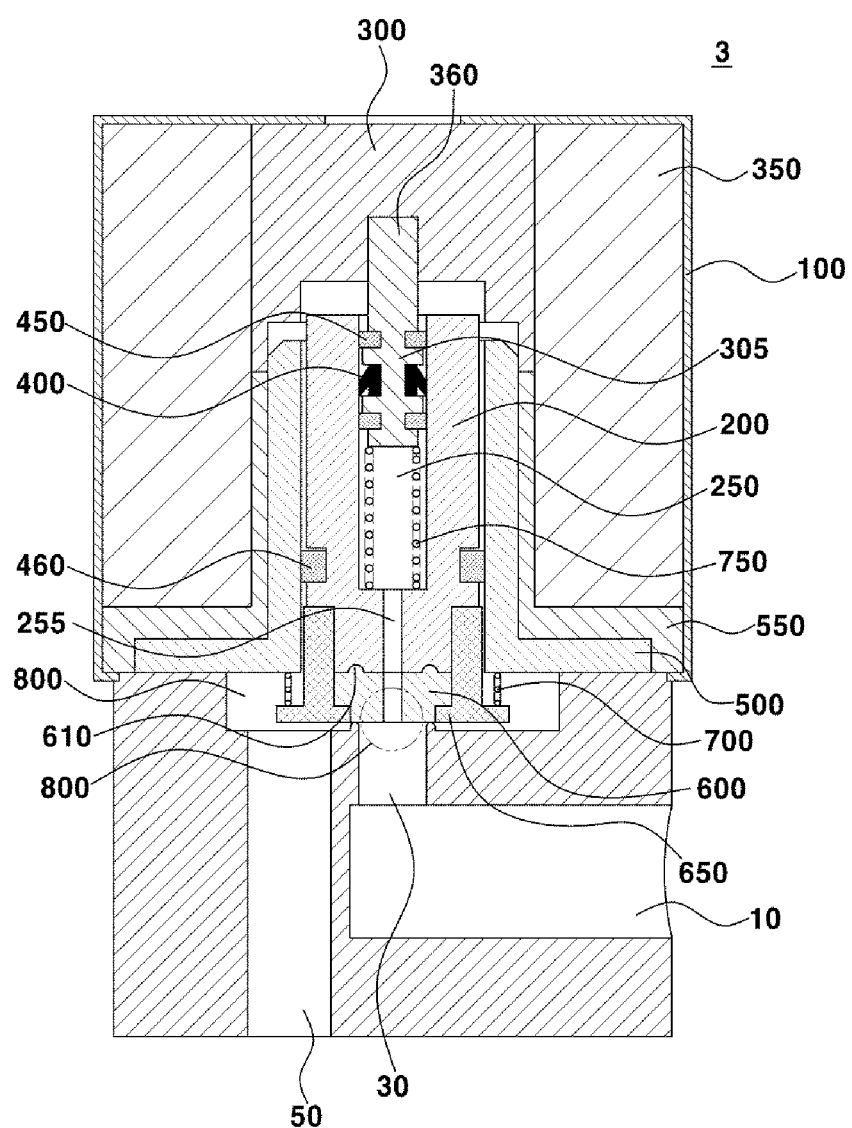
FIG. 7 is a diagram showing a fuel supply valve according to still another embodiment of the present disclosure.

FIG. 7 is a diagram showing a fuel supply valve according to still another embodiment of the present disclosure. For the sake of simplicity of description, a description identical to that of FIG. 2 will be omitted.

Referring to FIG. 7, a fuel supply valve 3 may be provided with a spring 750 within the pressure chamber 250, and provided with a chamber guide 360 inserted into the hollow of the plunger 200. The spring 750 may connect the bottom surface of the pressure chamber 250 with the chamber guide 360. The chamber guide 360 is a configuration that is connected with the core part 300 to be inserted into the plunger 200, and the pressure chamber 250 may be defined by the chamber guide 360, the block part 400, and the plunger 200.

According to an embodiment of the present disclosure, the spring 750 may be disposed within the pressure chamber 250 rather than being disposed on the path through which the gas flows, thereby minimizing disturbance of the gas flow by the spring 750.

According to an embodiment of the present disclosure, the chamber guide 360 and the core part 300 may be separately formed without molding them integrally. In this case, it is possible to enhance the processability of the core part 300, and separately manufacturing the materials of the chamber guide 360 and the core part 300. For example, the core part 300 may be made of a magnetic material, and the chamber guide 360 may be made of a non-magnetic material.

As described above, although the embodiments of the present disclosure have been described with reference to the accompanying drawings, it will be understood by those skilled in the art to which the present disclosure pertains that other specific forms may be embodied without changing the technical spirit or the essential features thereof. Therefore, it should be understood that the above-described embodiments are illustrative and are not restrictive in all respects.

What is claimed is:

1. A fuel supply valve for supplying fuel from a fuel tank to a fuel cell stack, the fuel supply valve comprising:
    a plunger having a hollow therein;
    a core part disposed on the plunger; and
    a block part disposed within the hollow to maintain airtightness between the core part and the plunger,
    wherein a space in which airtightness of the hollow has been maintained by the plunger, the core part, and the block part is defined as a pressure chamber,
    wherein the pressure chamber is connected with an internal flow path penetrating an airtightness member disposed on a lower portion of the plunger,
    wherein the internal flow path is opened by lifting the plunger to discharge gas within the pressure chamber,
    wherein the fuel supply valve further includes a valve body disposed on a lower portion of the airtightness member,
    wherein the valve body comprises a seat part contacting the airtightness member by movement of the plunger,
    wherein the seat part blocks the gas within the pressure chamber from being discharged by contacting the airtightness member, and wherein the seat part comprises an internal space through which gas flows and the internal space is connected with the internal flow path,
    wherein a diameter of a cross section of the internal flow path perpendicular to a direction extending from the pressure chamber to the internal space is smaller than a diameter of a cross section of the pressure chamber perpendicular to the direction extending from the pressure chamber to the internal space;
    wherein the internal flow path directly connects the internal space and the pressure chamber; and
    Wherein a diameter in all sections of the inner flow path is smaller than a diameter of the pressure chamber.

2. The fuel supply valve of claim 1,
    wherein the core part has an extension part inserted into the hollow of the plunger,
    wherein the block part is disposed between the extension part and the plunger, and
    wherein the extension part transfers a magnetic force to the plunger.

3. The fuel supply valve of claim 2,
    wherein the extension part has a columnar shape having a curved outer surface, and
    wherein the block part is disposed in a recess of the extension part to maintain airtightness between the extension part and the plunger.

4. The fuel supply valve of claim 1, further comprising a chamber guide inserted into the hollow of the plunger and connected with the core part,
    wherein the block part is disposed between the chamber guide and the plunger.

5. The fuel supply valve of claim 4, further comprising a spring disposed within the pressure chamber to connect the plunger with the chamber guide.

6. The fuel supply valve of claim 1,
    wherein a length of the internal space is equal to a length of the pressure chamber in a direction perpendicular to the direction from the seat part toward the pressure chamber.

7. The fuel supply valve of claim 6,
    wherein a cross-sectional area opened by the internal space is equal to a cross-sectional area of the pressure chamber.

8. The fuel supply valve of claim 1,
    wherein the seat part comprises further comprises an intermediate flow path for connecting the internal space with a fuel inlet for supplying fuel from the fuel tank, and
    wherein a diameter of the intermediate flow path is equal to the diameter of the pressure chamber.

9. The fuel supply valve of claim 8,
    wherein the plunger is moved in a first direction flowing from the seat part toward the pressure chamber to open the internal flow path, and
    wherein when the internal flow path is opened, a force applied to the plunger in the first direction by the gas in-flowed through the intermediate flow path is canceled by a force applied to the plunger in a second direction that is the direction opposite to the first direction through the gas flowing within the pressure chamber.

10. The fuel supply valve of claim 1, further comprising an airtightness member fixing part disposed to be symmetrical with respect to the internal flow path,
    wherein the opened region provided to the airtightness member fixing part has a larger cross-sectional area in the horizontal direction than that of the pressure chamber so that the internal flow path is disposed.

11. The fuel supply valve of claim 1, further comprising a porous member disposed within the pressure chamber,
    wherein the porous member is disposed on a lower portion of the pressure chamber adjacent to the internal flow path.

* * * * *